(12) United States Patent
Zuzga et al.

(10) Patent No.: US 11,944,037 B2
(45) Date of Patent: Apr. 2, 2024

(54) HEMP HARVESTER

(71) Applicant: Jonathon J. Zuzga, Sebewaing, MI (US)

(72) Inventors: Jonathon J. Zuzga, Sebewaing, MI (US); Craig Robert Maurer, Bad Axe, MI (US)

(73) Assignee: Evolve3, LLC, Sebewaing, MI (US)

( * ) Notice: Subject to any disclaimer, the term of this patent is extended or adjusted under 35 U.S.C. 154(b) by 519 days.

(21) Appl. No.: 17/061,278

(22) Filed: Oct. 1, 2020

(65) Prior Publication Data

US 2021/0100167 A1    Apr. 8, 2021

Related U.S. Application Data

(60) Provisional application No. 62/910,023, filed on Oct. 3, 2019.

(51) Int. Cl.
*A01D 45/06* (2006.01)
*A01D 45/00* (2018.01)
*A01D 47/00* (2006.01)

(52) U.S. Cl.
CPC .......... *A01D 45/065* (2013.01); *A01D 45/00* (2013.01); *A01D 47/00* (2013.01)

(58) Field of Classification Search
CPC ......... A01D 45/00–45/30; A01D 46/00–46/30
See application file for complete search history.

(56) References Cited

U.S. PATENT DOCUMENTS 2,674,080 A * 4/1954 Wilson .................. A01D 46/12
56/33
2,701,438 A * 2/1955 Sawyer ................. A01D 46/12
56/33
(Continued)

FOREIGN PATENT DOCUMENTS

DE    3005701 A1 * 8/1981
EP    2687082 A1 * 1/2014 ............. A01D 45/16
(Continued)

OTHER PUBLICATIONS

Hemp Harvesting Equipment, USA Hemp.
(Continued)

*Primary Examiner* — Thomas B Will
*Assistant Examiner* — Madeline I Runco
(74) *Attorney, Agent, or Firm* — Mitchell Intellectual Property Law, PLLC

(57) ABSTRACT

A hemp harvester which strips the leaves and flowers from the stalks and branches of a hemp plant and separates them for subsequent processing includes a branch lifter for lifting and bunching the branches of the hemp plants as the harvester advances towards them; a stripper with counter rotating stripper rollers having radially extending resiliently flexible paddles which converge as said rolls turn to trap said flowers and leaves between them and strip the flowers and leaves from said stalks and branches; a capture system for capturing the separated flowers and leaves as they are stripped from the stalk and branches of the plants, a transfer and mulcher system for mulching and transferring said flowers and leaves from said capture system to a collection chamber; and an uprooting system for uprooting and collecting the stripped plants as said hemp harvester passes.

7 Claims, 23 Drawing Sheets

(56) References Cited

U.S. PATENT DOCUMENTS

| | | | | |
|---|---|---|---|---|
| 3,010,159 | A | * | 11/1961 | Roberson ............... A01D 46/08 19/203 |
| 3,073,098 | A | * | 1/1963 | Farrar .................... A01D 45/22 56/16.5 |
| 3,855,760 | A | * | 12/1974 | Smith, Jr. .............. A01D 45/00 56/13.2 |
| 3,872,655 | A | * | 3/1975 | Davis, Sr. .............. A01D 45/16 56/330 |
| 4,107,902 | A | * | 8/1978 | Suggs .................... A01D 45/16 53/142 |
| 4,192,124 | A | * | 3/1980 | Balthes .................. A01D 45/16 56/11.9 |
| 4,679,386 | A | * | 7/1987 | Lundahl ................. A01D 41/08 460/123 |
| 6,185,921 | B1 | * | 2/2001 | Taylor .................... A01D 45/16 56/27.5 |
| 2002/0004418 | A1 | * | 1/2002 | Mesquita ............. A01D 89/001 460/115 |
| 2005/0039429 | A1 | * | 2/2005 | Haverdink ............. A01D 46/08 56/30 |
| 2019/0307082 | A1 | * | 10/2019 | Parker ................... A01G 24/25 |
| 2019/0368975 | A1 | * | 12/2019 | Petty, Jr. ................. G01N 1/08 |

FOREIGN PATENT DOCUMENTS

| | | | | |
|---|---|---|---|---|
| EP | 2826357 | A1 | * | 1/2015 ............ A01D 45/16 |
| SU | 123791 | A1 | * | 11/1959 |
| SU | 134512 | A1 | * | 11/1959 |

OTHER PUBLICATIONS

Triminator, Philip Morris International 2017.
FarmProgress, Mar. 15, 2016.
Bailey Rahn, Cannabis Anatomy: The Parts of the Plant, Jun. 9, 2014.

* cited by examiner

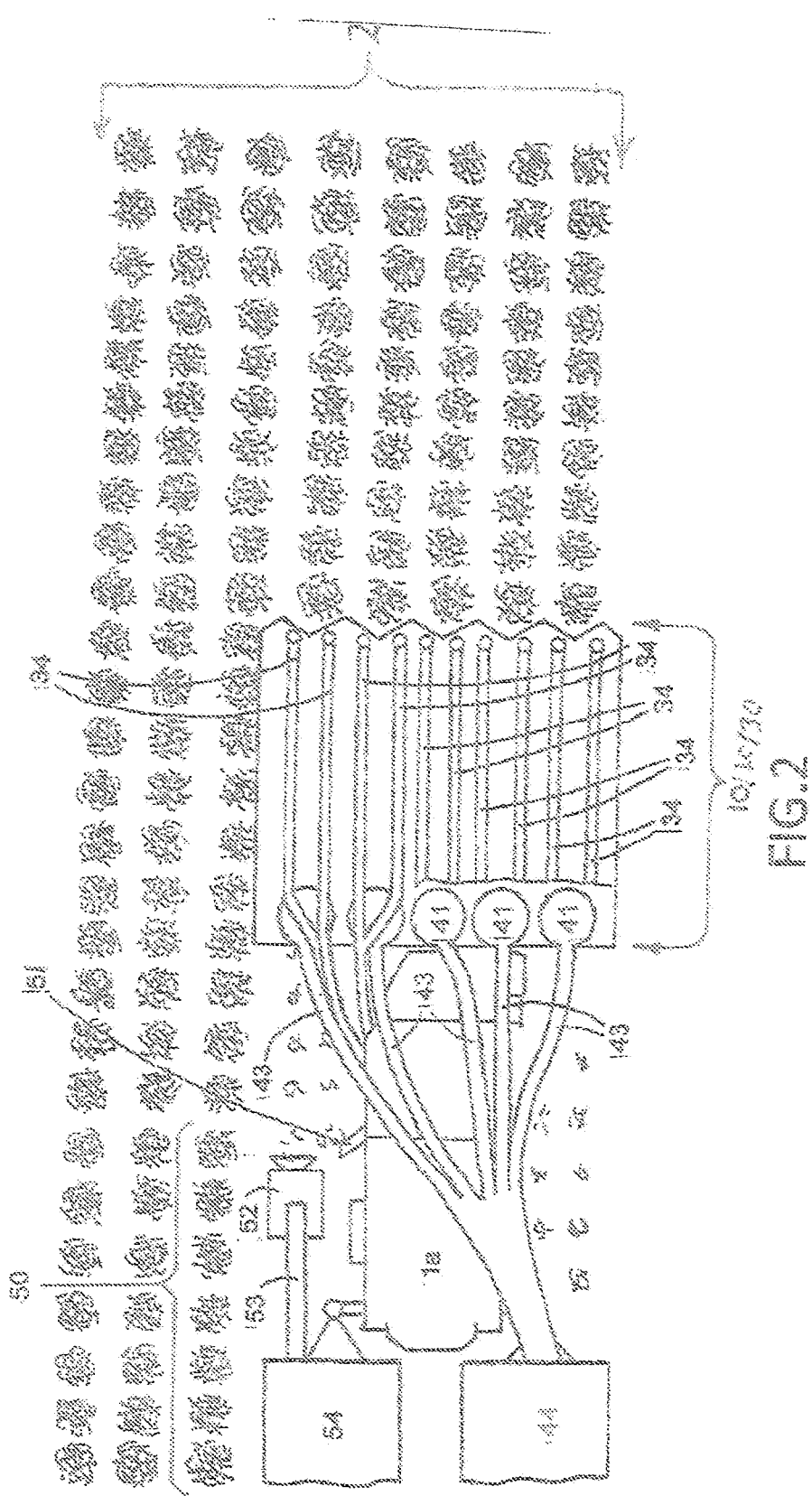

HEMP HARVESTER

CLAIM OF PRIORITY

This application claims priority to U.S. provisional application Ser. No. 62/910,023 filed on Oct. 3, 2019 and entitled HEMP HARVESTER.

FIELD OF THE INVENTION

The present invention relates to the field of hemp harvesters.

BACKGROUND

Hemp plants have stalks which are thicker at the bottom than at the top. Branches grow off of the stalk at various heights and angles. Hemp leaves grow out of the sides of the branches in both male and female plants.

Male flowers grow on the stalk of the male plants, usually near the nodes where the branches project from the stalk. The male flowers provide the pollen which pollenates the flowers of the female plant.

Flowers grow out of the ends of the branches and the top of the stalk, with the flower at the top of the stalk being the largest. A cola is a collection of flowers growing in a group. The flowers contain the highest level of the sticky CBD/THC oil. Some Cannabis plants have a higher concentration of THC, and others have a higher concentration of CBD. The leaves also have a useful concentration of the CBD/THC. The hemp plants have a height of from about 1 to about 7 feet. The width varies from about 8 inches to about 40 inches, depending on spacing when seeded.

The goal in harvesting is to harvest the flowers on the female plants, preferably before they are pollenated. This harvesting is typically done by hand. Some mechanical harvesters have been made. These usually employ a front-end paddle wheel arrangement which harvests the whole plant for subsequent grinding up into a useable product.

SUMMARY OF THE INVENTION

The present invention is a hemp harvester which separates the leaves and flowers from the stalks and branches. The stalks and branches are separated for subsequent processing.

These and other features, objects and advantages of the invention will become apparent by reference to the Description of the Preferred Embodiments and the appended drawings.

BRIEF DESCRIPTION OF THE DRAWINGS

FIG. 2 is a plan view of the apparatus;

DESCRIPTION OF THE PREFERRED EMBODIMENTS

Figure 1:
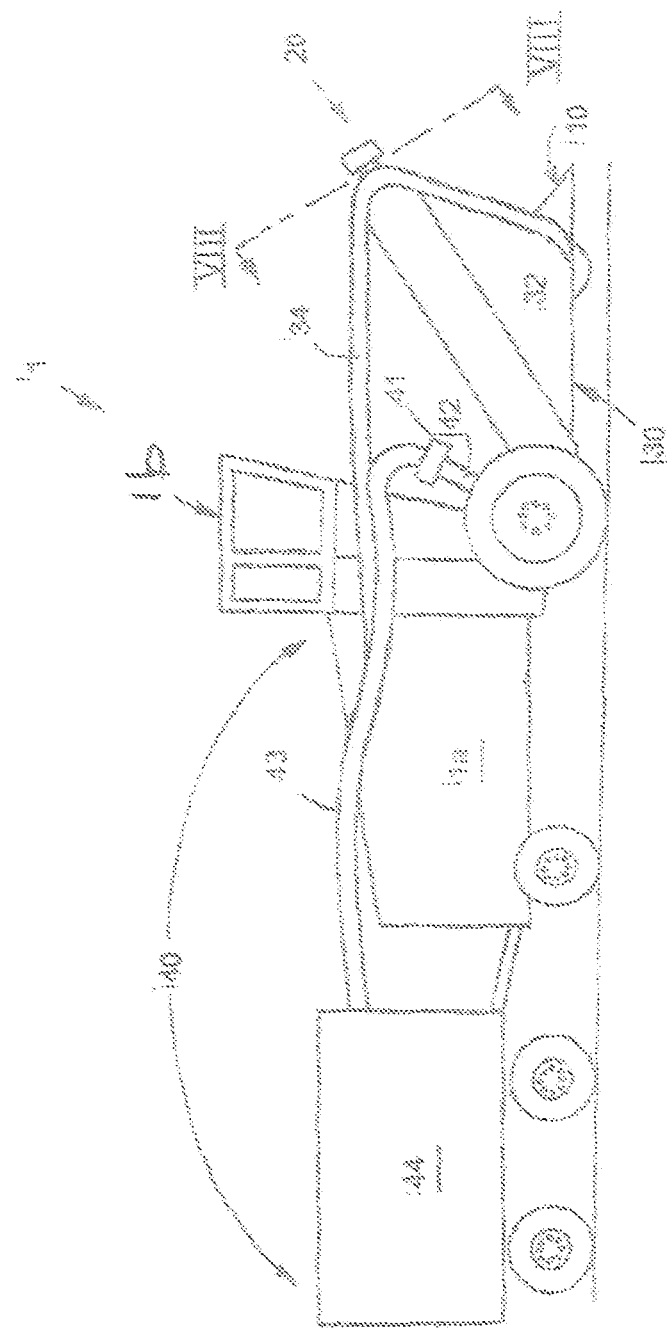
FIG. 1 is a side view of the preferred embodiment harvester.
Figure 2A:
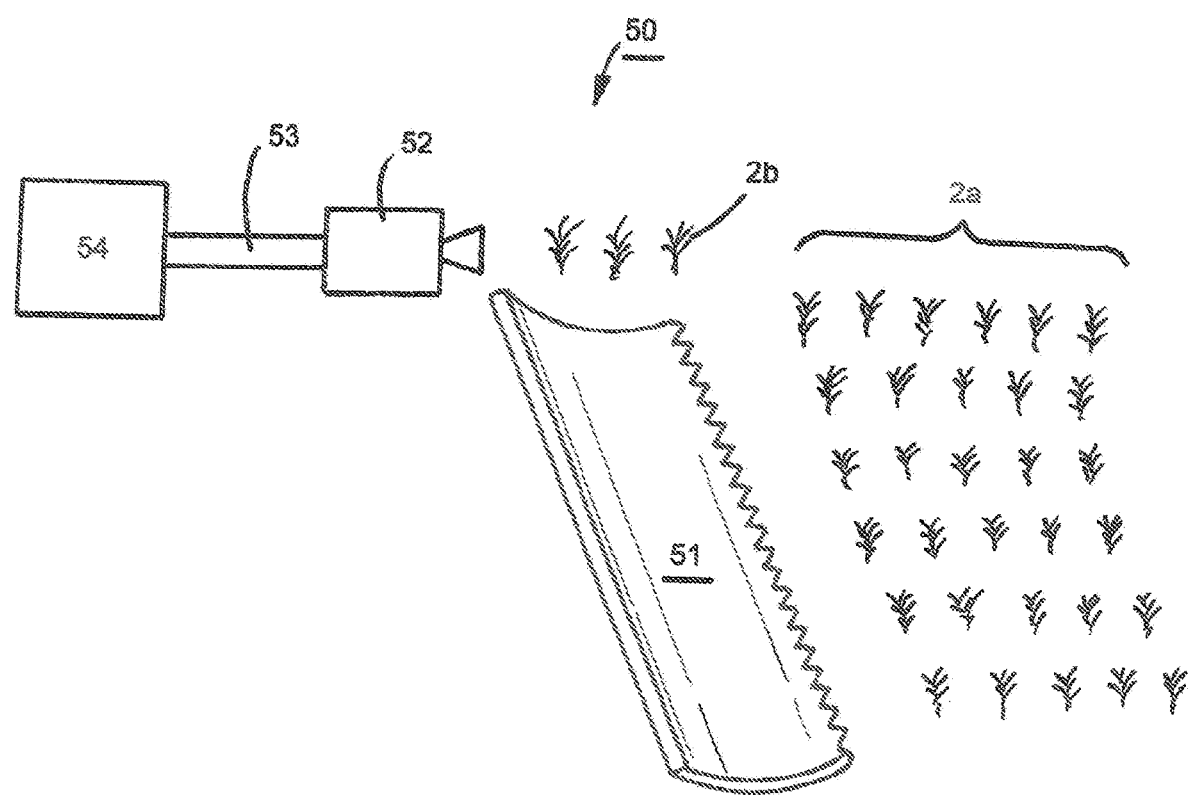
FIG. 2A is a schematic of the uprooting system 50 portion of the harvester.
Figure 3:
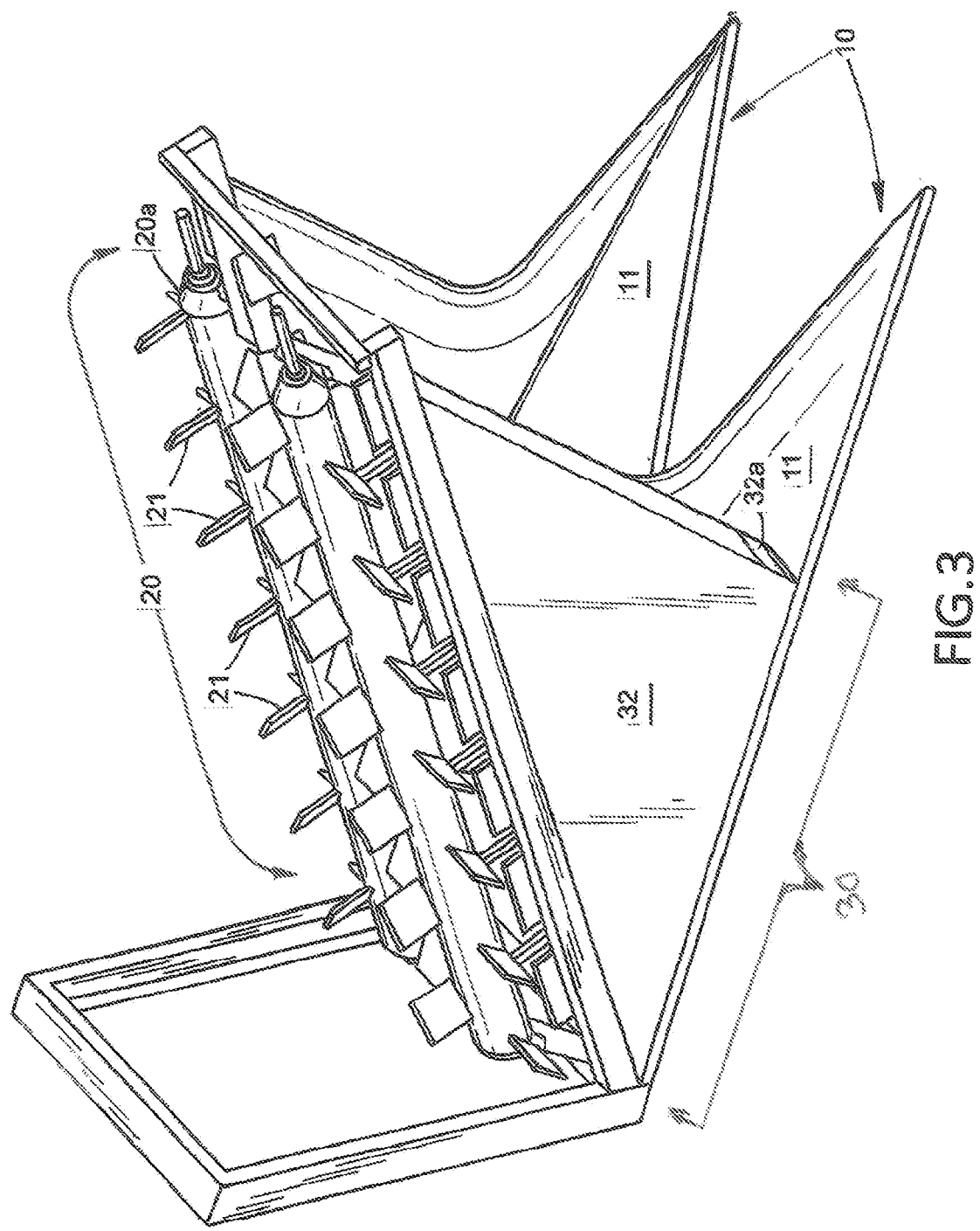
FIG. 3 is a perspective view of the combined lifter/stripper/capture assemblies 10-30.

In the preferred embodiment, the hemp harvester 1 comprises a branch lifter system 10 for lifting and bunching the branches of the hemp plants 2 as the harvester advances towards them, a stripper system 20 with counter rotating stripper rollers 20a having radially extending paddles 21 for gently stripping the flowers and leaves off the stalk and branches, a capture system 30 for capturing the flowers and foliage as they are stripped from the stalk and branches of the plants, a collecting and mulching system 40 for collecting and mulching the separated flowers and leaves and conveying the mulched product to a collection bin 44, and an uprooting system 50 for uprooting the stripped plants from the ground and conveying them for subsequent processing (FIGS. 1-3).

As can be seen from FIG. 2, the apparatus preferably comprises a plurality of lifter/stripper/collection assemblies 10/20/30 extending across the front of the harvester in order to harvest multiple rows of plants 2 at one time. Five assemblies for simultaneously harvesting five rows at a time are shown.

The various components of these systems are identified in the following component list:
1 Preferred embodiment hemp harvester
   1a Mechanical section
   1b Cab
2 Hemp plants
3 Preferred embodiment hemp harvester adapted for mounting on a tractor 4
3A Mounting frame for mounting harvester 3 to tractor 4
10 lifter system
   11 lifting blades 20 stripper system
  20a rollers
  21 paddles
    21a-d Variations in types of paddles
  22 solid rubber pads
  23 slit rubber pads
    23a pad fingers
  24 solid rigid reinforcer plate
  25 fingered rigid reinforcer plate
    25a plate fingers
  26 saw toothed pad
30 Capture system for Capturing the flowers and foliage
  31 Top shroud over rollers
  32 Capture chambers
    32f blower opening into capture chambers 32
    32b exit openings from capture chambers 32
    32c front wall of chamber 32
    32d bottom wall of chamber 32
    32e back wall of chamber 32
  33 Blower (Centrifugal fan)
  34 Blower line to front of capture chambers 32
30a Alternative capture system
  31a and 31b top shroud portions
  31c inverted channel shroud portion connecting portions 31a and 31 b
  32 Capture chambers
  32a Secondary capture chambers
40 Transfer, collecting and mulching system for collecting and mulching the flowers and foliage through vacuum system to collection bin
  41 Centrifugal mulching fan (CMF) with mulching impeller
  42 Vacuum line from capture chamber to CMF 41
  43 Discharge line from the CMF 41 to collection bin 44
  44 Collecting bin
40a Alternative transfer system
  33 blower
  33a venturi duct from blower 33
  34 blower duct from blower 33 (branching off of venturi duct 33a)
  34a, 34b, 34c, 34d and 34e blower ducts branching off of blower duct 34
  42 vacuum ducts coming from rear openings in capture chambers 32 and connecting to venturi duct 33a
  42a vacuum duct coming from the rear opening in inverted channel shroud portion 31c, and connecting to venturi duct 33a
  43 discharge line to collector 44 from the convergence of venturi duct 33a and vacuum ducts 42 and 42a
50 Uprooting system for uprooting and conveying the plants to windrow or pickup for subsequent processing
  51 Uprooting blade or auger
  52 optional plant pick up and mulcher
  53 mulcher discharge line
  54 mulched plant collector Lifter System 10

Figure 7:
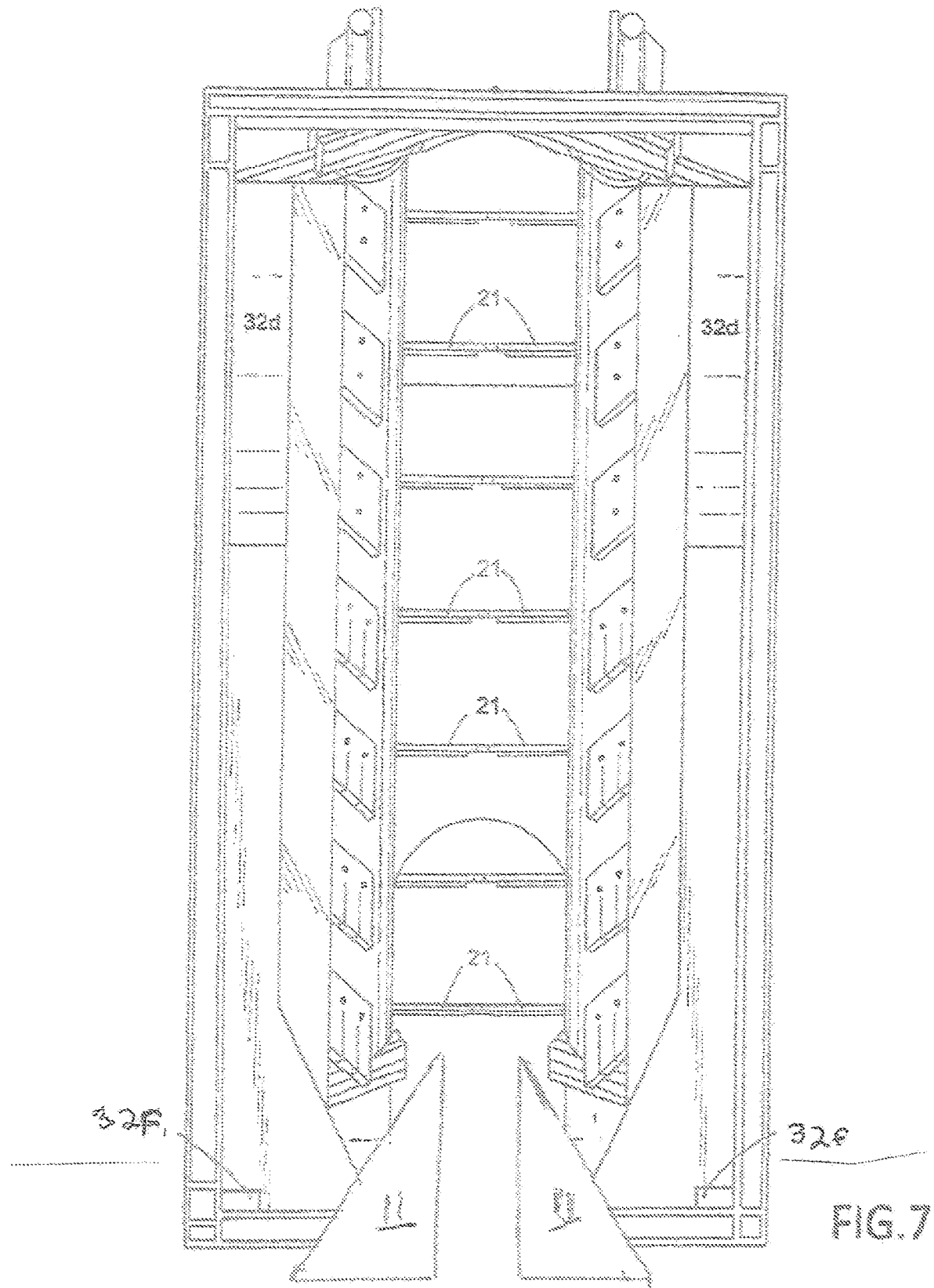
FIG. 7 is a front elevation of lifter/stripper/capture assemblies 10/20/30.
Figure 9:
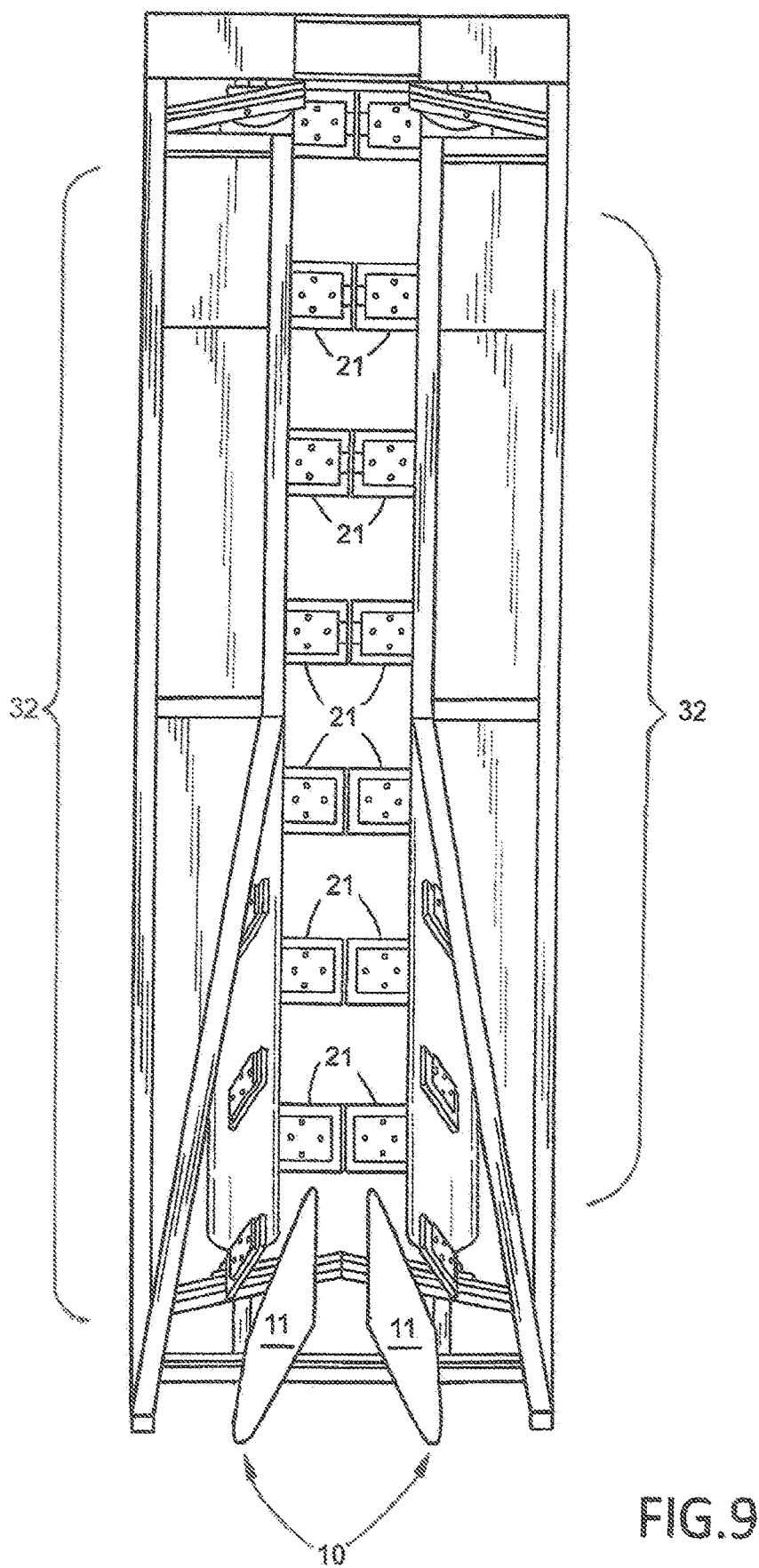
FIG. 9 is a bottom view of lifter/stripper/capture assemblies 10/20/30.

Lifter system 10 comprises a pair of lifter blades 11 located at the front of harvester 1. Each blade 11 is located in front of and extends back a part of the way under each of the counter rotating stripper rolls 20 (FIGS. 3, 7 and 9). Preferably, blades 11 ride on wheels (not shown) which keep them just above ground level. Blades 11 are farther apart at their front and funnel inwardly toward one another to thereby narrow the distance between them towards their rear portions. As harvester 1 approaches a hemp plant 2, it lifts the branches and funnels them into bunches more compact bunches as harvester 1 progresses over them. This positions and arranges plants 2 for stripper rolls 20a to strip their flowers and leaves.

Stripper System 20

Stripper system 20 comprises two counter rotating stripper rolls 20a, having rows of radially extending paddles 21 which come together as the rolls turn and gently strip the flowers and leaves from plants 2, leaving the stalks and branches behind (FIGS. 1 and 3-10). Rolls 20a are inclined forwardly and upwardly at an angle to the horizontal such that the tops of plants 2 are harvested first (FIGS. 1, 3). The lower parts of the plants are stripped by converging paddles rearwardly and progressively lower down on inclined rolls 20a as harvester 1 proceeds forwardly. Preferably, the angle of inclination is adjustable as a function of the length of rolls 20a and the height of the plants being harvested. The rolls can vary in length depending on the height of the plants, and the speed of rotation desired. Faster rotation results in faster harvesting. Slower rotation yields a more thorough, gentle and complete harvest. The preferred embodiment rolls 20a are ten feet long. Typically, the angle of inclination will be from about 25-35 degrees.

Paddles 21 need to be mounted on rolls 20a so as to be generally perpendicular to the plant and horizontal to the ground when they engage, such that the flowers and foliage are severed and propelled upwardly by the engaging and upwardly rotating paddles. Thus, the pitch of the paddles relative to the longitudinal axis of the rolls will vary depending on the angle of the rolls to the ground. Where the angle of incline of rolls 20a is adjustable, the pitch of paddles 21 needs to be adjustable. This may be achieved, for example, by providing the paddles with mounting stems which seat in tubular mounts having set screws which can be loosened to facilitate changing the pitch of the paddle and tightened when the pitch is right.

Figure 5:
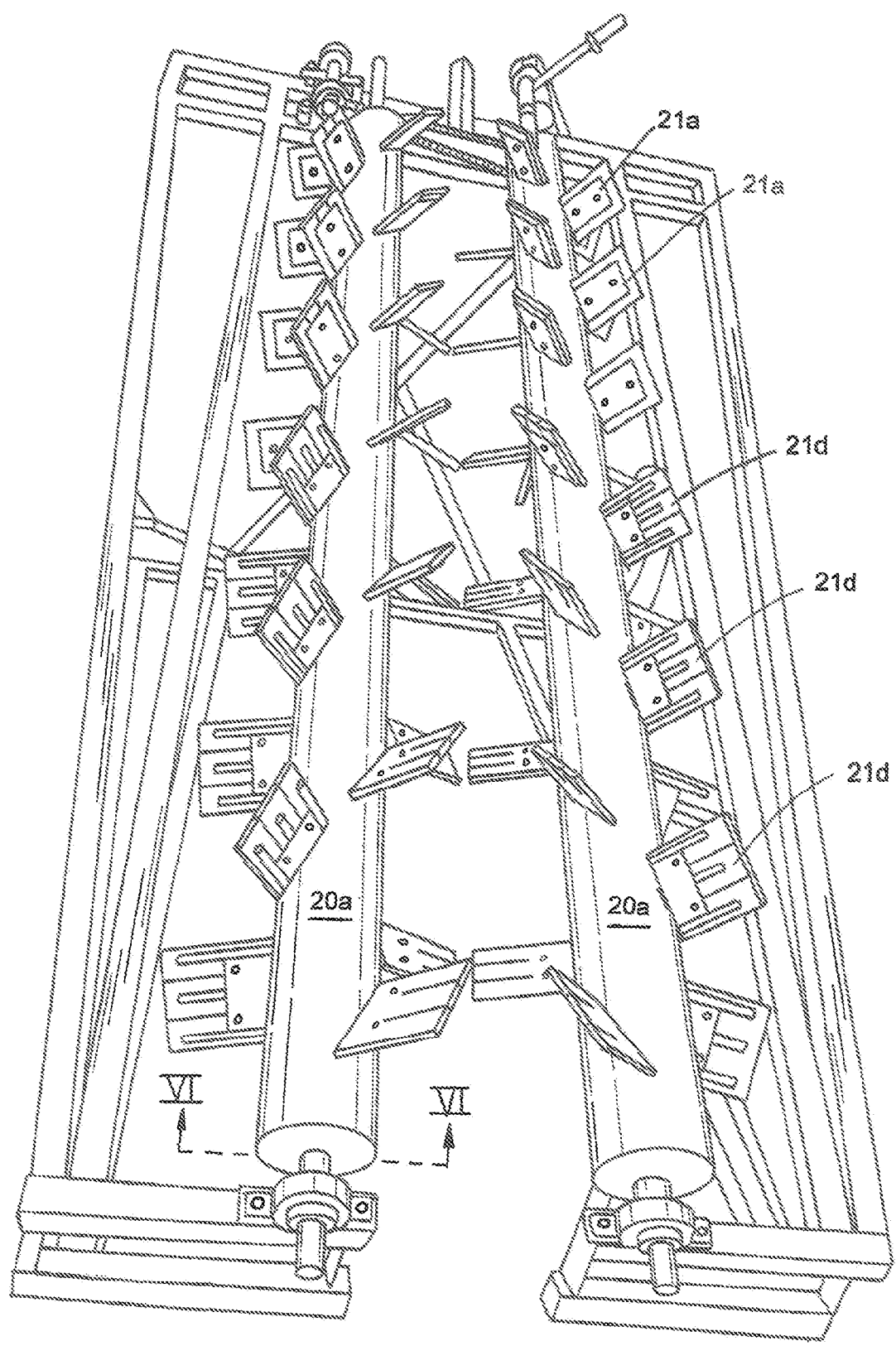
FIG. 5 is a rear perspective of stripper assembly 20.
Figure 6:
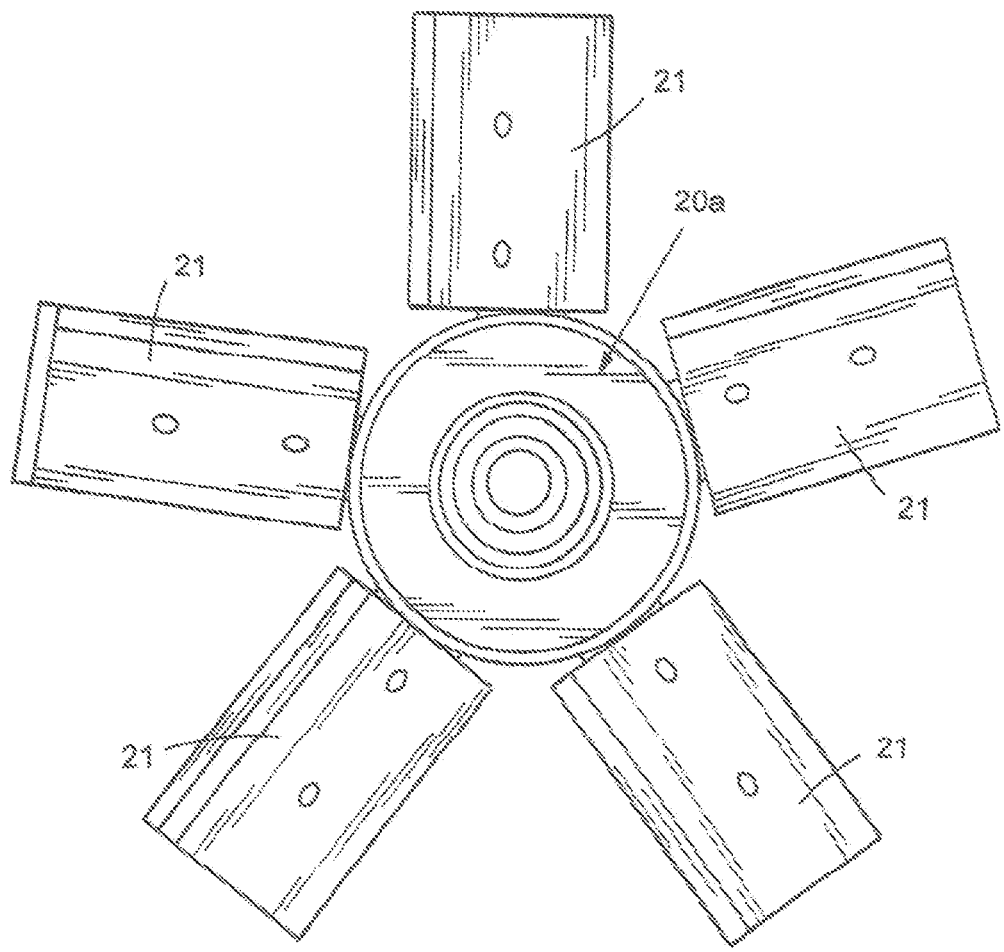
FIG. 6 is an end view of a stripper roll 20a and radially extending paddles 21, taken from plane VI-VI of FIG. 5.

Preferably, variable pitch paddles 21 are mounted in two separate flights in a spiral pattern around roll 20a (FIG. 5). There are 17 paddles in each flite, nine use solid pads 22 and eight use fingered pads 23. Each spiral goes through 180 degrees, and the two spirals are spaced 180 degrees apart from each other. From an end view (FIG. 6), one sees 5 rows of paddles spaced 72 degrees from each other, four rows with seven paddles and one with six paddles.

The paddles 21 extending radially from rolls 20a are made of a flexible plastic or rubber pad 22 or 23 (FIGS. 14, 15) and a rigid reinforcing plates 24 or 25 made of steel, rigid plastic or the like (FIGS. 16-19). The rubber or plastic pads of the paddle must be firm enough to strip the flowers and foliage between them as they wipe by the stalks and branches. However, they must be flexible enough that they do not break apart or cut the stalks and branches as they do so. In one preferred embodiment, pads 22 and 23 are made of ⅜ thick two-ply polyester belting material. Other plastics or rubber can be used, e.g. PVC, polyurethane, butyl rubber or the like.

Figure 14:
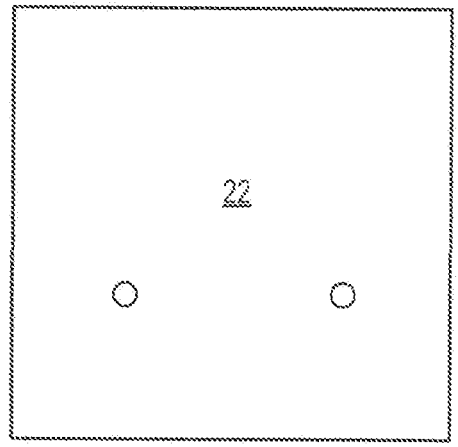
FIG. 14 is a solid rubber pad 22.
Figure 15:
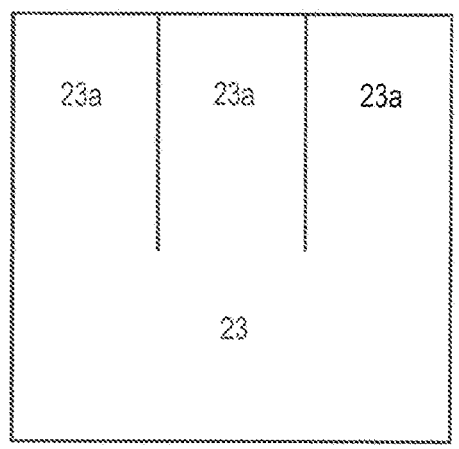
FIG. 15 is a slit rubber pad 23.

Pads 22 and 23 are 6 inches by 6 inches. Pads 22 are solid from border to border (FIG. 14). Pads 23 are split into three 2-inch wide "fingers" 23a, extending from the "top" edge, or "engaging edge" of the pad, to a depth of 2½ inches.

Figure 16:
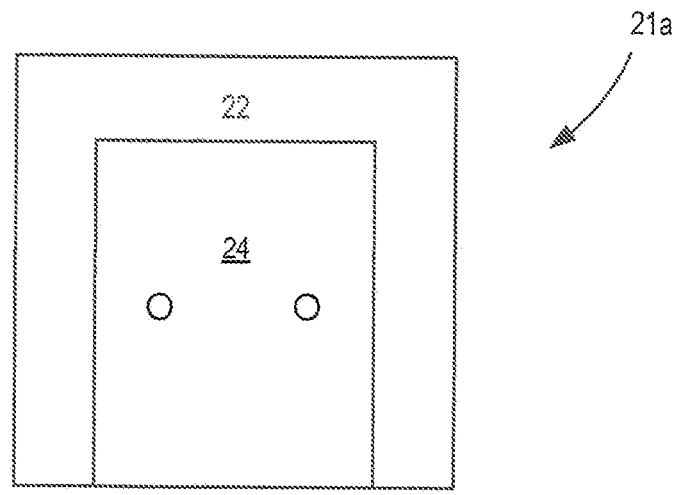
FIG. 16 is an elevation of a reinforcing plate backed rubber pad.
Figure 17:
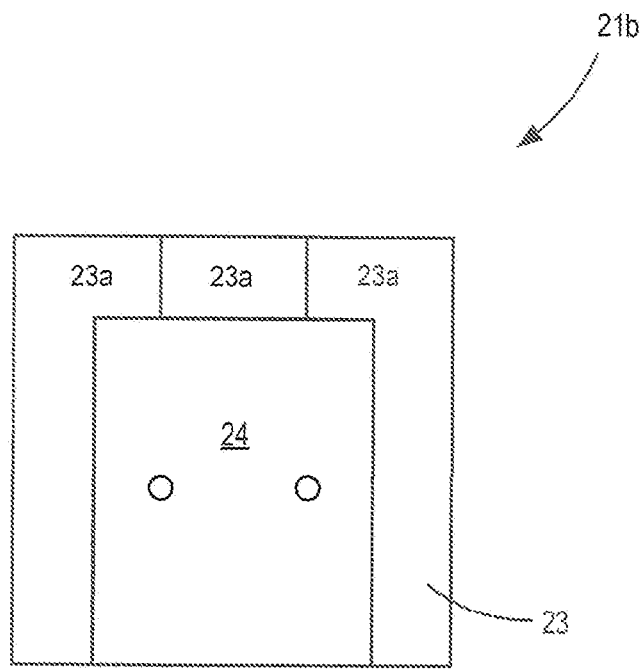
FIG. 17 is an elevation of a reinforcing plate backed slit rubber pad.
Figure 18:
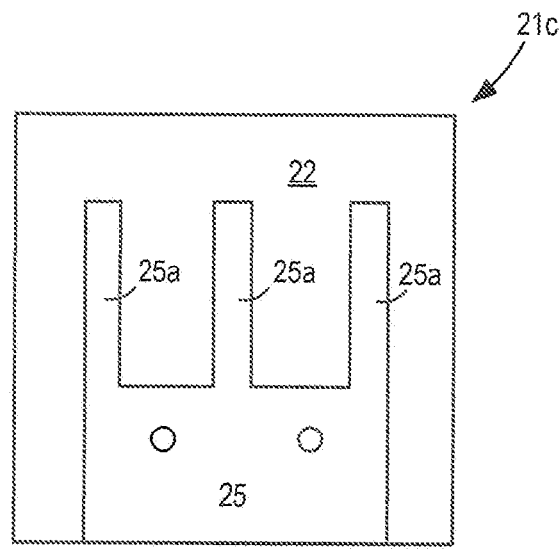
FIG. 18 is an elevation of a fingered reinforcing plate backed rubber pad.

The rubber pads 22 or 23 are reinforced by rigid reinforcing plates 24 or 25 to enhance the rigidity of the rubber (FIGS. 16-19). The reinforcing plates 24 or 25 can be made of any rigid material, e.g. steel, a rigid plastic material, etc. As shown, pads 22 or 23 are secured to and backed by steel or other rigid material plates 24 and 25. The pads at the bottom half of each roll are reinforced with a fingered steel plate 25 (FIGS. 18, 19) to allow extra spacing for the larger stalk at the bottom of each plant, such that the stalks are not severed when trapped between the paddles. The pads 22 or 23 at the top half of each roll 20a are reinforced with a solid steel plate 24, to maximize stripping away the valuable top flowers of the plant (FIGS. 16, 17).

A portion of the rubber or plastic pad 22 or 23 extends beyond the top and side edges of reinforcing plate so as to flex when a stem or branch is trapped between engaging counter rotating paddles. The rubber pads are 6×6 inches. The rigid reinforcing plates reinforcing the top paddles are 4 inches wide×5 inches high, thus leaving an exposed 1-inch rubber or plastic pad at the top of the paddle, and 1-inch on each side.

The fingered steel backing plates 25 have a base which is 4 inches wide and 2½ inches high. The steel fingers 25a are ½-inch diameter (or ½-inch wide) and extend 2½ inches above the 2½×4-inch plate creating base of reinforcing member outside dimension of 4×5 inches. The fingers 25a are either round stock and welded to the base plate or are stamped out of steel integral with the base plate.

The engaging paddles strip leaves and flowers off of the stalk and branches, leaving the branches and stalks behind. The rolls 20a are positioned a distance apart such that their paddles 21 would overlap by about ½-inch as they engage, but for the fact that they are timed to engage in an endwise abutting fashion (see FIG. 4A). This causes the paddles to flex slightly as they engage. The paddles remain engaged through about 2½ inches of upward rotation. This is referred to as the "stripping arc" of paddles 21.

Figure 19:
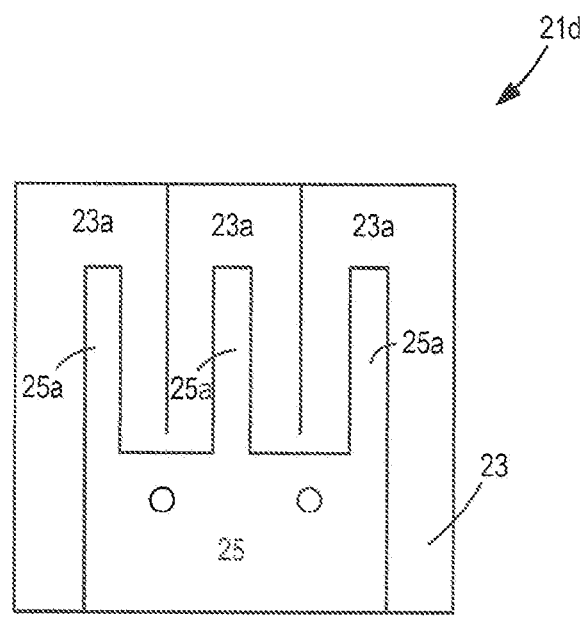
FIG. 19 is an elevation of a fingered reinforcing plate backed slit rubber pad.

Stripper system 20 uses paddles 21a, comprising solid pads 22 reinforced by solid reinforcing plates 24 (FIG. 16), paddles 21b comprising split pads 23 backed by solid reinforcing plates 24 (FIG. 17), paddles 21c comprising solid pads 22 backed by three finger reinforcing plates 25 (FIG. 18) and paddles 21d comprising split pads 23 backed by three finger reinforcing plates 25 (FIG. 19). In a ten-foot roll 20a, the bottom 2½ feet use paddles 21c and the top 2½ feet use paddles 21a. The middle five feet of roll 20a uses paddles 21d in the lower half of the middle, and paddles 21b in the upper half.

As an alternative, reinforcing members 24 or 25 could be molded into pads 22 or 23. Pads could be molded in a bi-component molding process, such that the base of the pad could be made of a more rigid plastic material, and the top and surrounding edges of a more flexible plastic material. Alternatively, a plastic could be used with the appropriate blend of stiffness and flexibility that it performs well without the use of a reinforcing plate.

Figure 20:
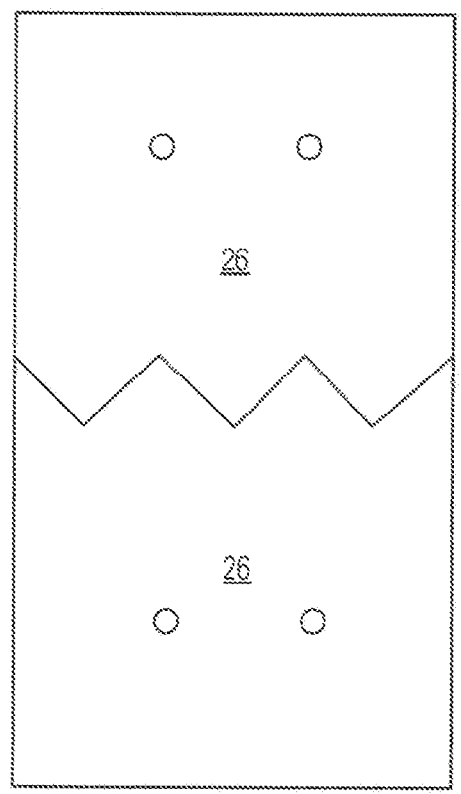
FIG. 20 is an elevation of engaging saw-toothed rubber pads.

FIG. 20 discloses yet another pad variation in saw tooth pads 26. The abutting saw tooth edges will provide sufficient flexibility at multiple points between the abutting ends of pads 26 that reinforcing members will likely prove unnecessary.

The stripper rolls 20a and the pitch of paddles 21 are thus best positioned and equipped to gently strip the tender flowers and leaves from the top portion of the plants 2 first, and then strip the flowers and leaves from the stiffer and more dense lower branches and stalks.

The Capture System 30

Figure 4:
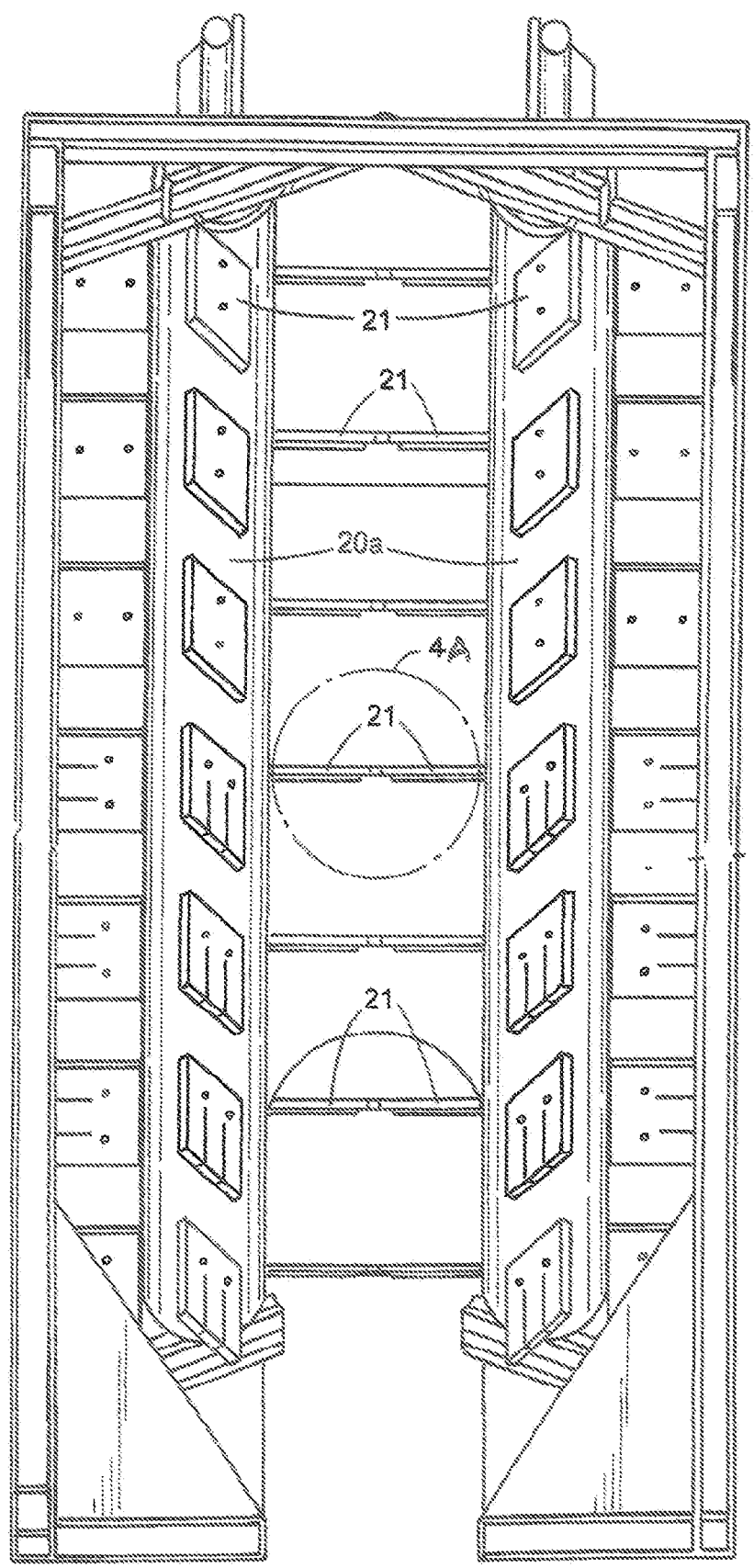
FIG. 4 is a front elevation of the stripper assembly alone.
Figure 4A:
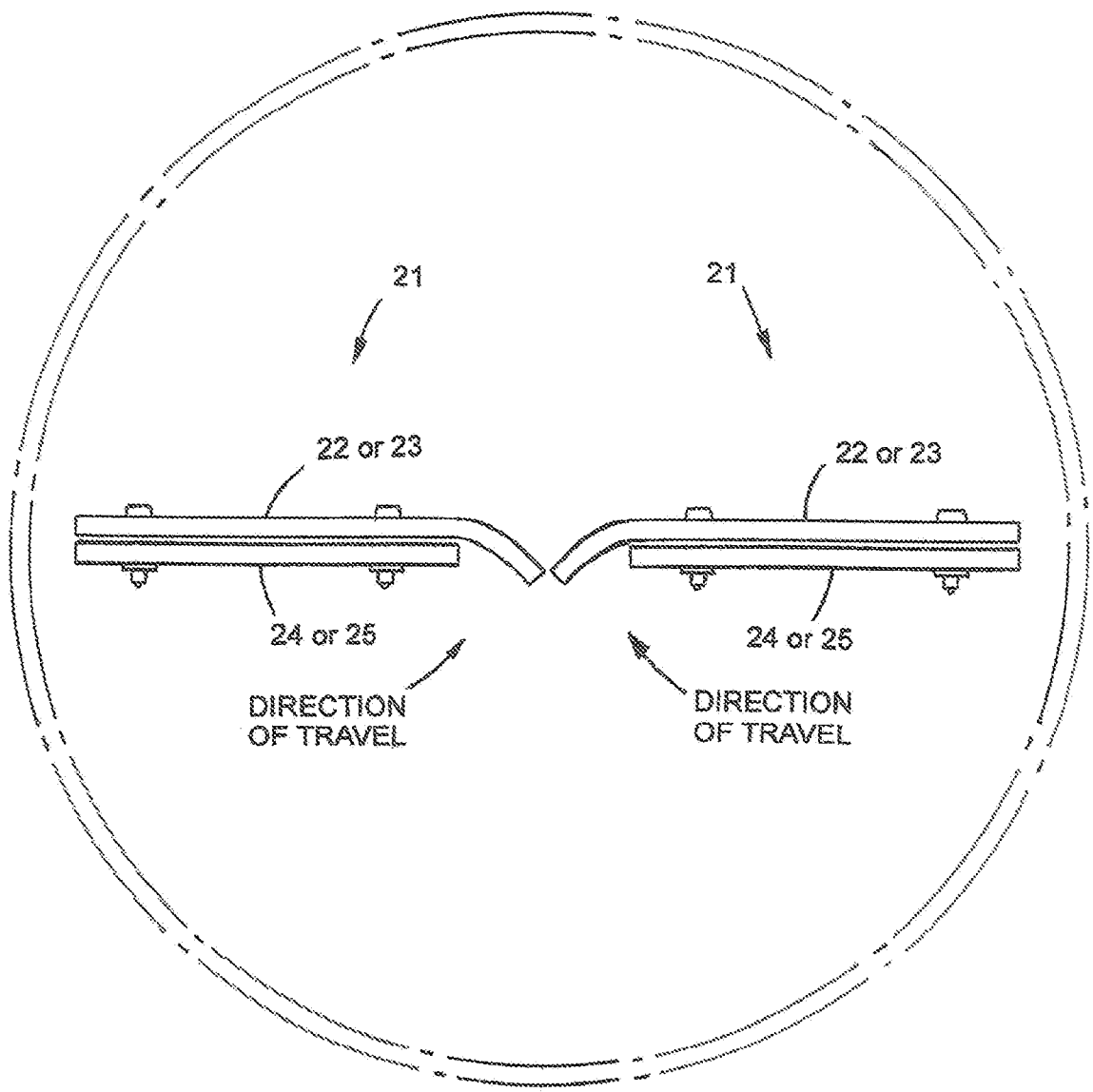
FIG. 4A is a close up of the encircled area 4A of FIG. 4.
Figure 10:
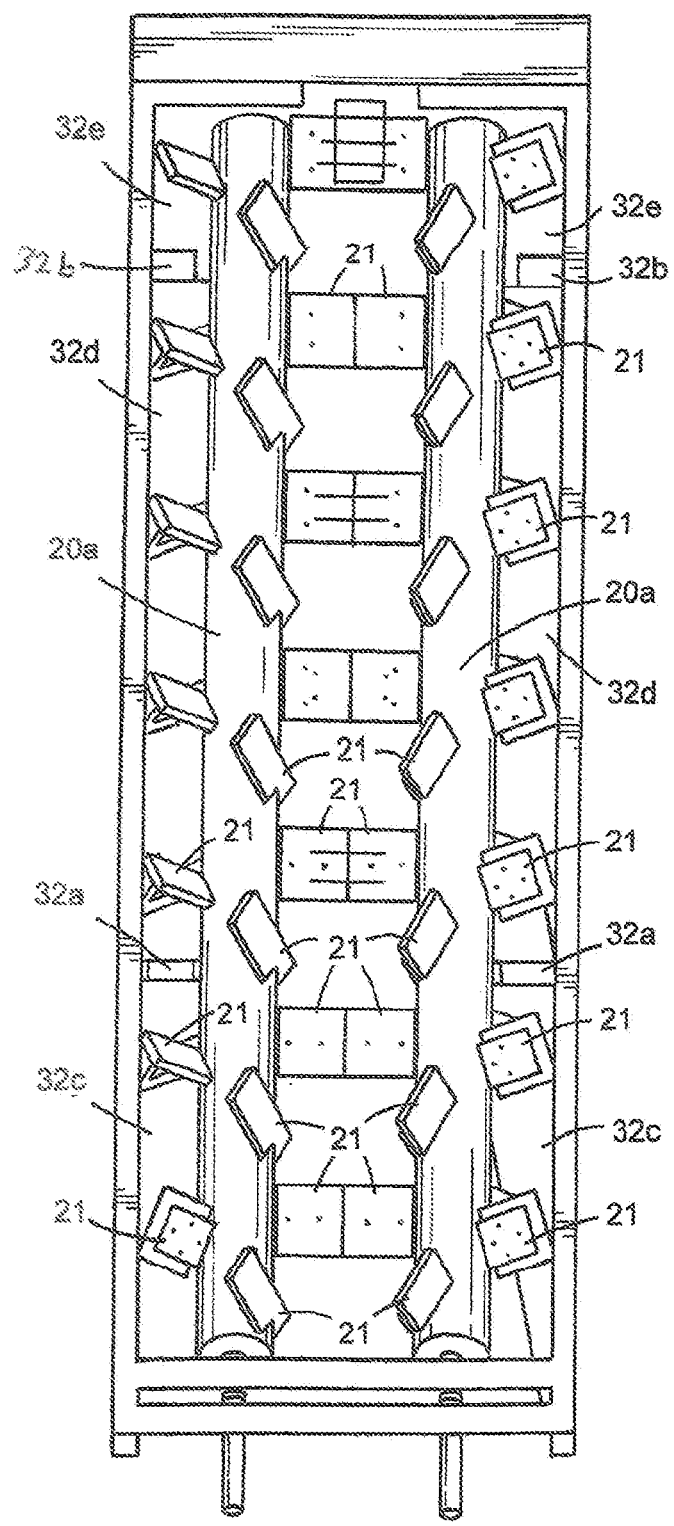
FIG. 10 is a top plan of stripper and capture assemblies 20-30.
Figure 11:
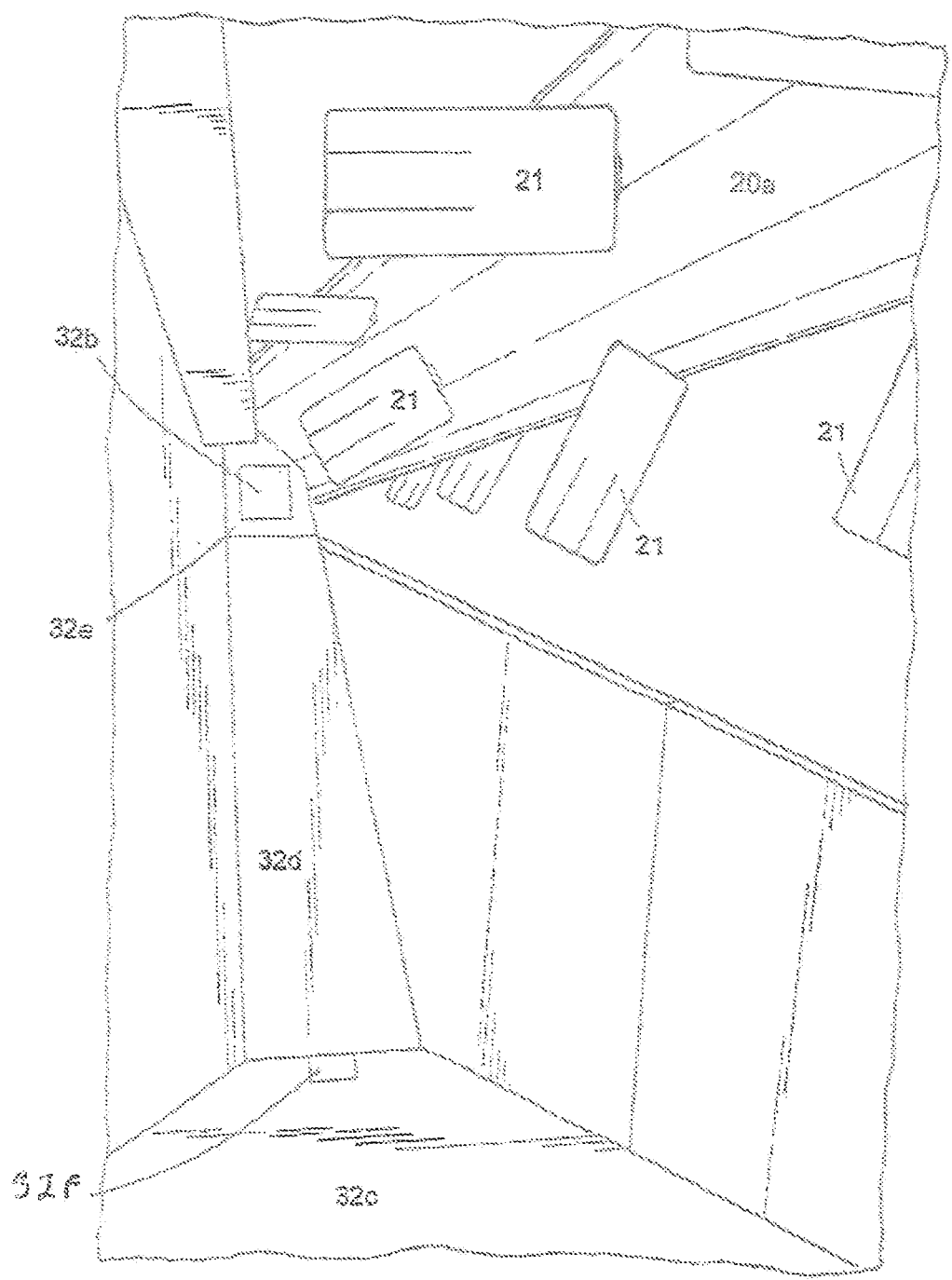
FIG. 11 is a view into a capture chamber 32.
Figure 12:
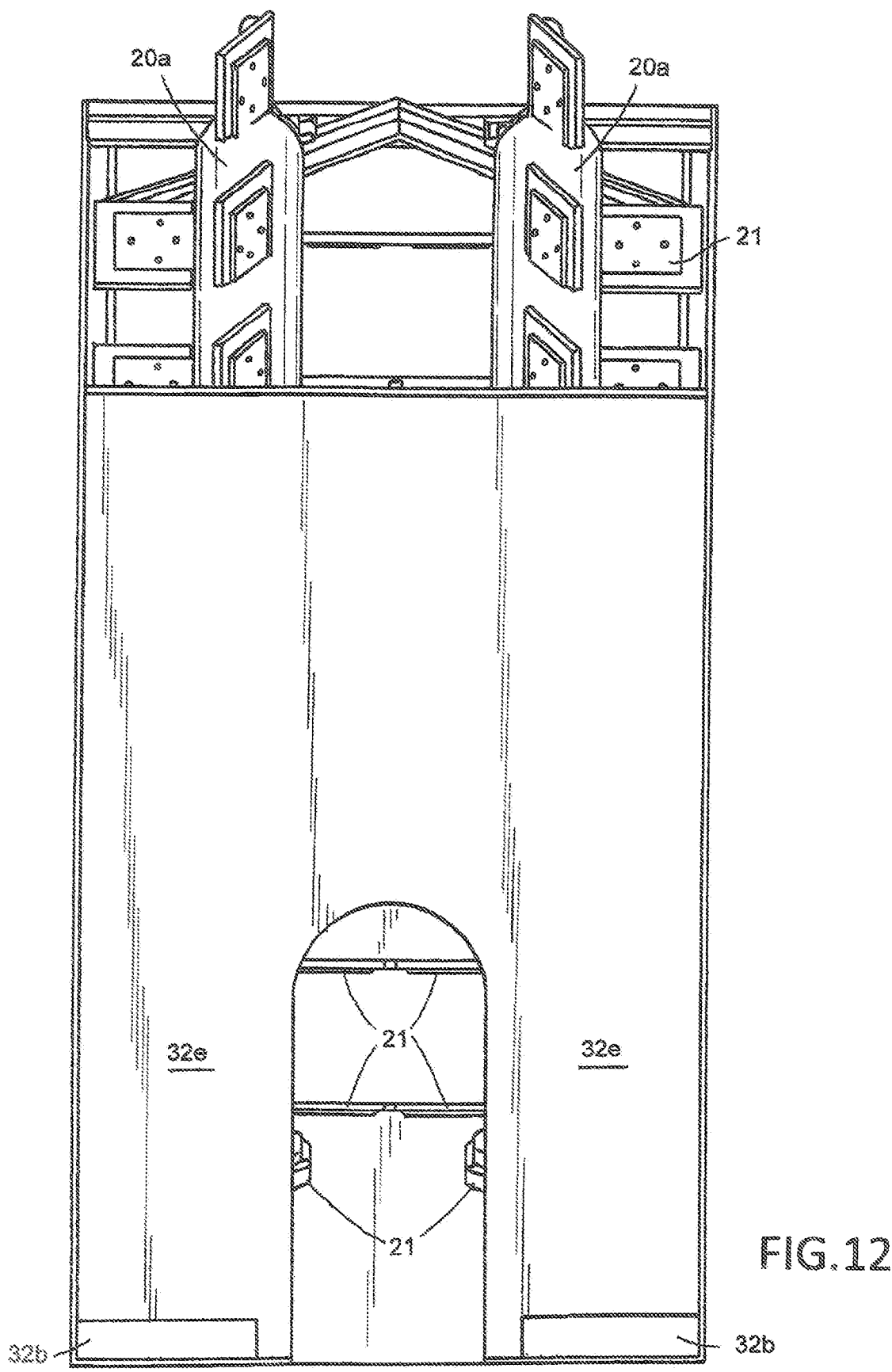
FIG. 12 is a rear elevation of stripper and capture assemblies 20 and 30.

The capture system 30 captures the flowers and leaves of the plants as they are stripped off the branches and stalks. It comprises a shroud 31 over rollers 20a, and over a pair of capture chambers 32 located on either side of rollers 20a (FIGS. 1, 3 and 7-11). Rolls 20a counter rotate in a direction such that the opposing paddles 21 are moving upwardly as they meet move through their stripping arc (FIG. 4A). The stripped flowers and leaves are thrown upwardly and over the counter rotating rolls 20a to either side, and then fall downwardly into the capture chambers 32 (FIGS. 7, 10 and 11.) A blower 33 located in the mechanical section 1a of harvester 1 is connected by a blower duct 34 to the front of each capture chamber 32, through an opening at the bottom of front chamber wall 32e (FIGS. 1, 2, 7, 8, 10, 11 and 13). (In FIG. 2, the full connecting lines 34 from the front of capture chambers 32 to the mechanical section 1a where blower 33 is located are shown only with respect to two of the lifter/stripper/capture assemblies 10/20/30. They are broken at the other three so that the centrifugal mulching fans 41 can be clearly shown and numbered.) The blower lines 34 direct a stream of flowing air across the bottom 32d of each capture chamber 32, thus gently blowing separated flowers and leaves towards a rear opening 32b at the base of the rear wall 32e of capture chamber 32 (See FIGS. 11, 12). The collection and mulching system 40 accept the severed flowers and leaves through rear opening 32b, through vacuum line 42 connected to rear opening 32b (FIG. 13), for delivery to collection chamber 44.

Alternative Embodiment Capture System

Figure 8:
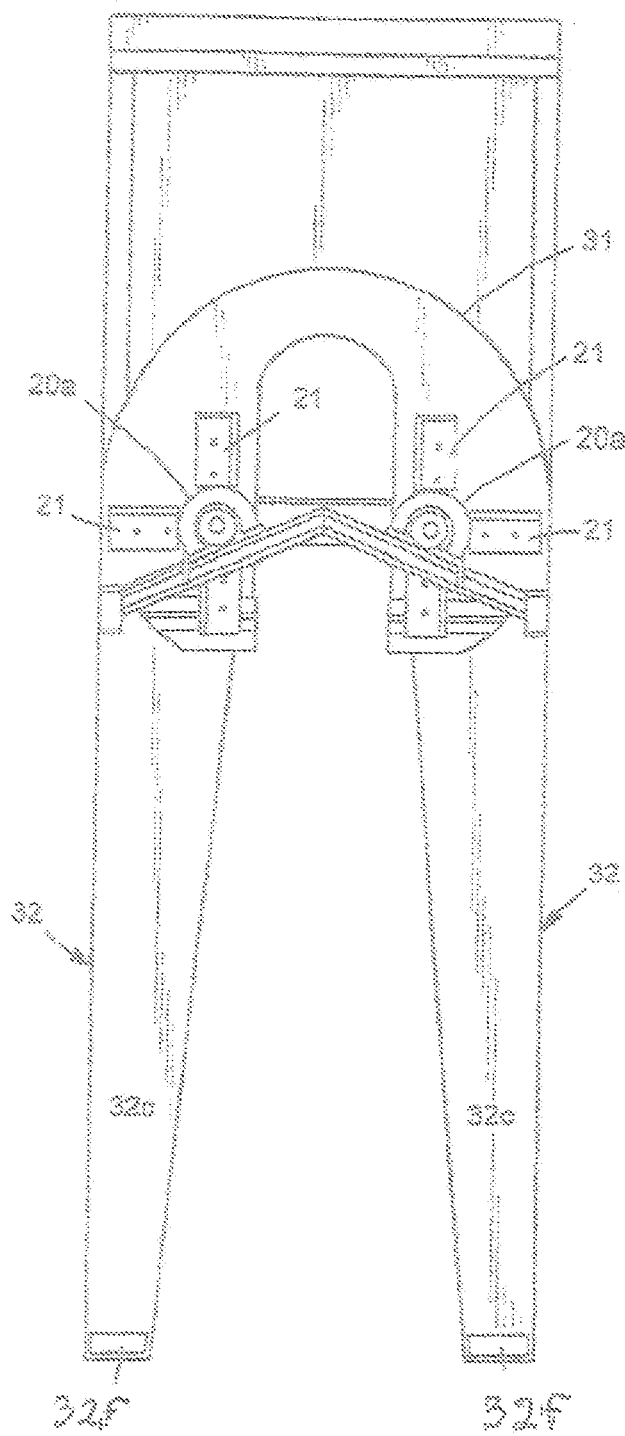
FIG. 8 is a sectional view on plane VIII-VIII of FIG. 1.
Figure 8A:
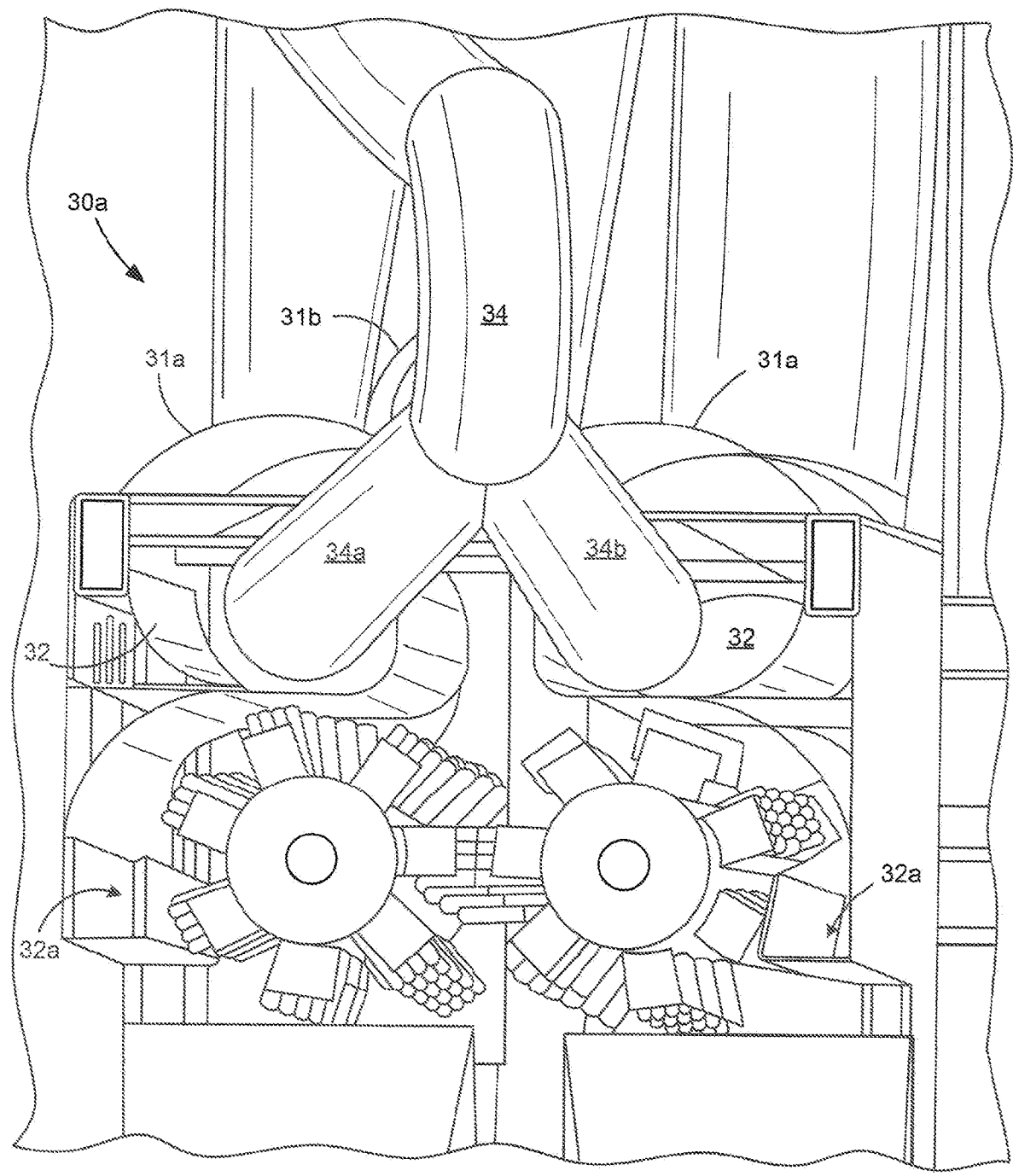
FIG. 8A is similar to FIG. 8, but of an alternative embodiment capture system which includes both primary and secondary capture systems.

FIG. 8A discloses an alternative embodiment capture system 30a. What was shroud 30 in the above embodiment is a three part shroud in capture system 30a: Shroud portions 31a and 31b over counter rotating rolls 20a is are joined by an upper portion 31b. Shroud portions 31a wrap outwardly and downwardly, then extend back inwardly over their respective rollers 20a, and then back upwardly a short distance to define said capture chambers 32. Chambers 32 each include a chamber opening which opens to said counter rotating rolls, such that counter rotating rollers strip the flowers and leaves and throw them upwardly and sideways such that they fall through said chamber opening and downwardly into the capture chambers 32. Blower ducts 34a and 34b coming off of a main blower duct 34 direct air from the front to rear of capture chambers 32 to force the flowers and leaves down and rearwardly through the chambers 32 and through the openings at the lower end of the capture chambers 32. Shroud portion 31b defines an inverted channel which opens downwardly toward the converging paddles 21 of rollers 20a. A duct 34c coming off of duct 34 is operably connected to an opening at the front of inverted channel 31b (not visible in FIG. 8A, but see FIG. 21) and delivers a flow of air to and through inverted channel 31b and helps keep flowers from falling directly back down between gaps which occur between the paddles as they rotate between points at which they engage. Inverted channel 31a includes a rear opening connected to a vacuum line 42a, which conveys the flowers and leaves from inverted channel 31a to a collection chamber 44.

Capture system 30a includes a secondary capture chamber 32a on either side of rollers 20a, and below capture chambers 32. As rollers 20a rotate outwardly and downwardly, some leaves and flowers may remain captured in the space between successive paddles and are thrown outwardly by centrifugal force into secondary capture chambers 32a. Ducts 34d and 34 e coming off of duct 34 direct blown air through secondary capture chambers 32a. Secondary chambers 32a merge with capture chambers 32 near their rear openings such that flowers flowing through them also exit through said rear openings in capture chambers 32.

Transfer, Collecting and Mulching System 40

Figure 13:
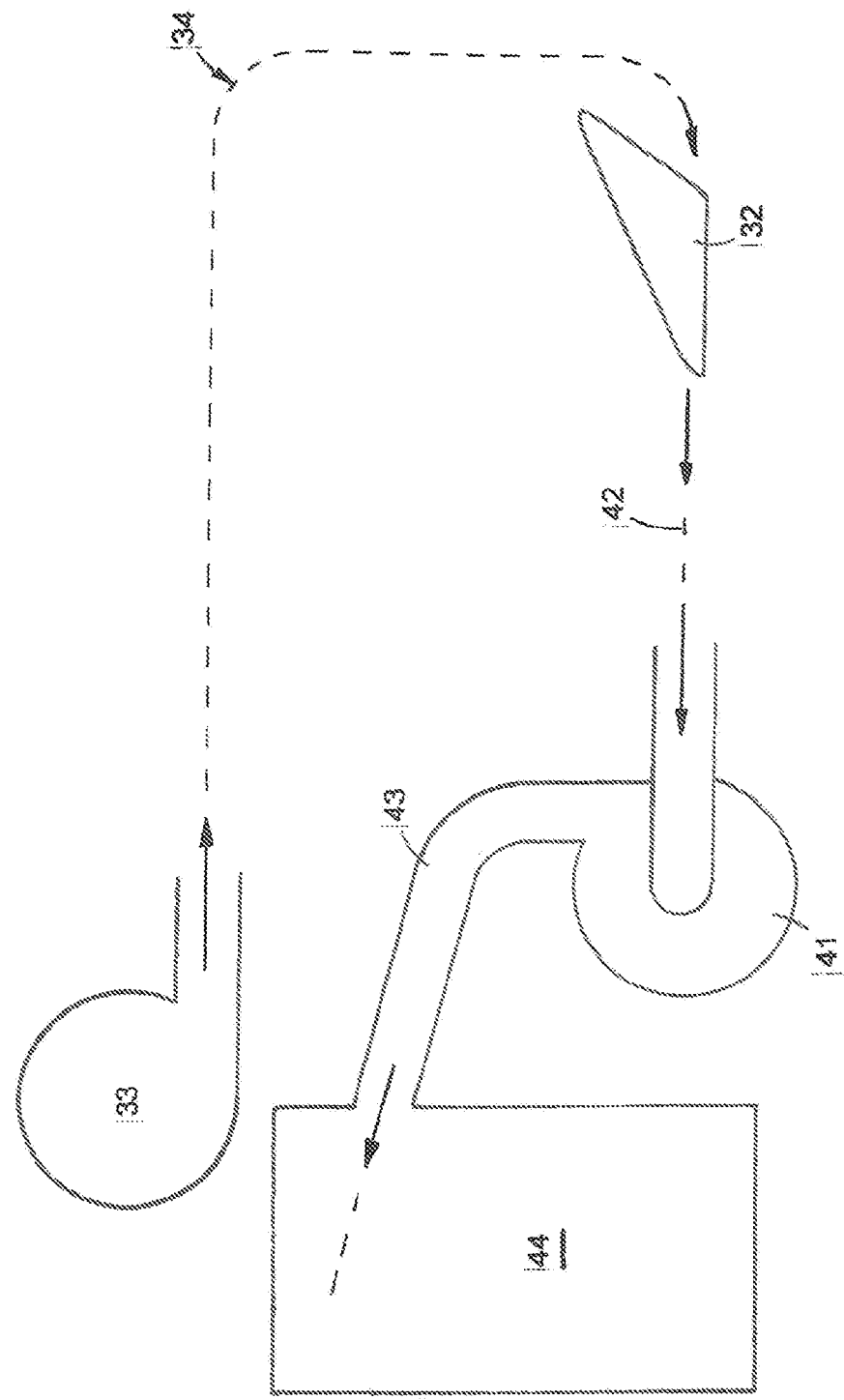
FIG. 13 is a schematic of the combined capture, mulching and collection systems 30-40.

Transfer, collecting and mulching system 40 includes blower fan 33 and blower duct 34 described above. It also comprises a centrifugal mulching fan 41 having a mulching impeller. It is connected to and draws a vacuum from capture chambers 32 through a vacuum line 42 connected to each chamber 32 at its rear opening 32b. The flowers and leaves are mulched by fan 41 and discharged through discharge line 43 to a collection chamber 44 (FIG. 13).

In the preferred embodiment, there is a centrifugal mulching fan 41 associated with each lifter/stripper/capture assembly 10/20/30 (FIG. 2). Each has its own discharge line 43 to collection chamber 44.

The Uprooting System 50

The uprooting system 50 uproots the stripped plants 2a, and conveys them to windrow 3 for further processing, or to a pick up 52 for further processing (FIGS. 2, 2A). The uprooting is accomplished by a blade 51 extending diagonally across the path of the approaching striped plants 2a (it is under harvester 1 and is only partially visible in FIG. 2). Because of its diagonal orientation, uprooted plants are diverted to windrow at the left of harvester 1 as viewed in FIG. 2, as harvester 1 continues forward. Alternatively, an augur could be used to uproot and convey the stripped plants or could be used in association with blade 51 to help convey the uprooted plants to windrow.

Optionally, one might wish to collect the uprooted plants as the harvesting proceeds. If so, a vacuum pick-up 52 could be positioned at the end of uprooting blade or auger 51. Further, vacuum pick up 52 could be a centrifugal mulcher fan which picks up and mulches the stripped uprooted plants. A discharge line 53 extends from vacuum pick up/mulcher fan 52 and conveys the stripped/mulched plants to a collector 54. A drier could also be incorporated into collector 54.

Operation

In operation, harvester 1 proceeds forwardly through multiple rows of hemp 2 with a lifter/stripper/capture assembly 10/20/30 for each row to be harvested. Each set of counter-rotating stripper rolls 20a is inclined forwardly and upwardly at a 25-35-degree angles to the horizontal. As plants 2 are approached, lifter blades gently lift and funnel the branches of the plants into bunches for harvesting by counter-rotating rolls 20a. As rolls 20a rotate, their opposing radially extending paddles 21 rotate into upwardly butting engagement with flowers and leaves trapped between them. As the abutting paddles 21 rotate upwardly through their stripping arc (FIG. 4A), they gently separate the flowers and leaves from their branches and stems and throw them into the air above and over rolls 20a and into capture chambers 32 located on either side of and below rolls 20a.

Blower 33 connected to capture chambers 32 by blower lines 34 directs a gentle flow of air from front to back through the bottom of capture chambers 32. From a rear opening 32b in capture chamber 32, the flowers and leaves are picked up by a vacuum line 42 which conveys them to a centrifugal mulching fan which mulches them and discharges them into collecting bin 44.

In the meantime, the diagonally oriented uprooting blade or auger or a combination thereof uproots the stripped plants and diverts/conveys them to windrow 2b to the left of the proceeding harvester (FIGS. 2, 2A). They either remain windrowed for field drying and later pick up and processing or are picked up by an optional vacuum/mulcher where they are discharged through line 53 to a collecting bin 54.

Tractor Mounted Alternative

Figure 21:
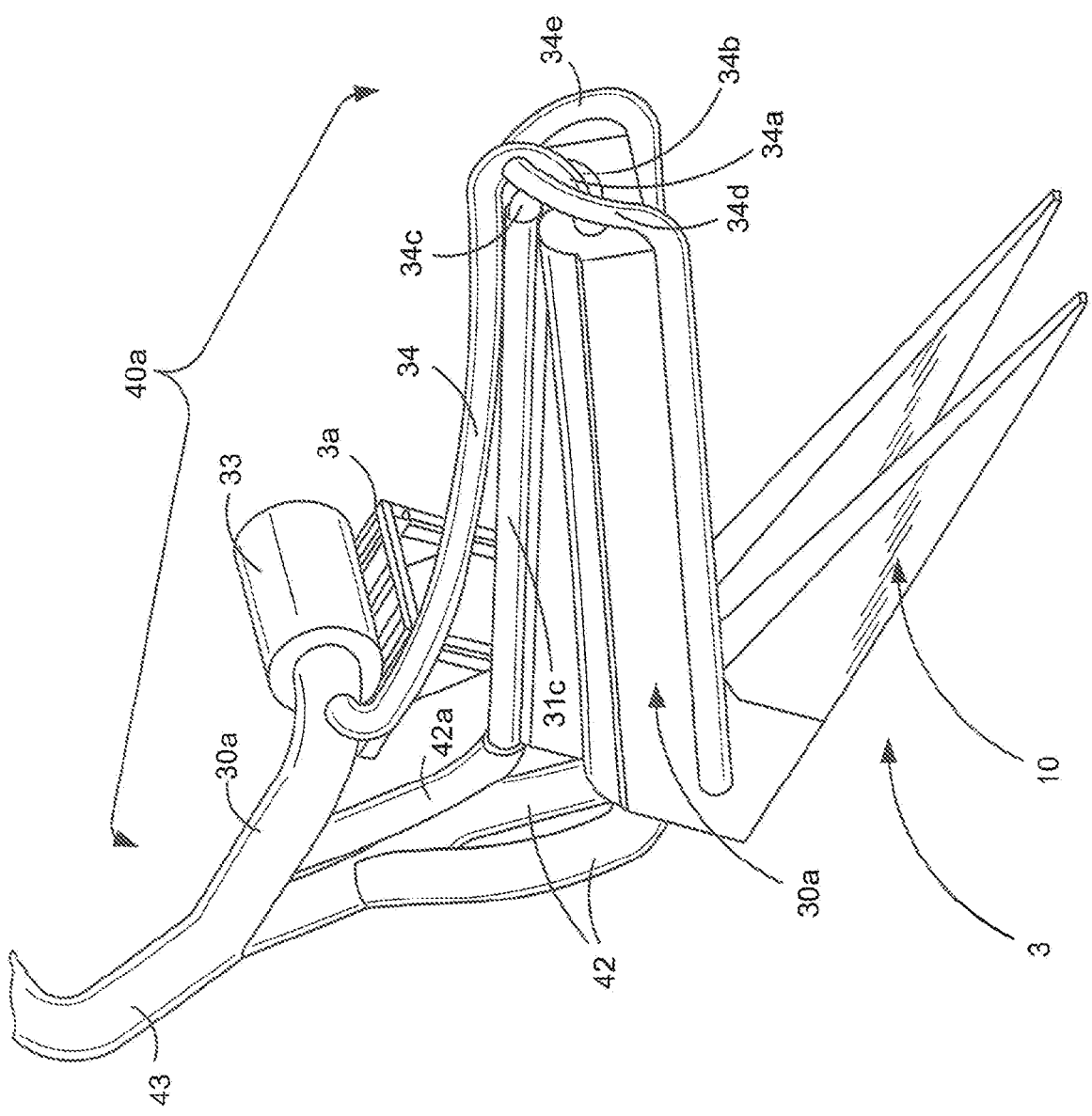
FIG. 21 is a perspective view of an alternative harvester 30a adapted for mounting on a tractor.
Figure 22:
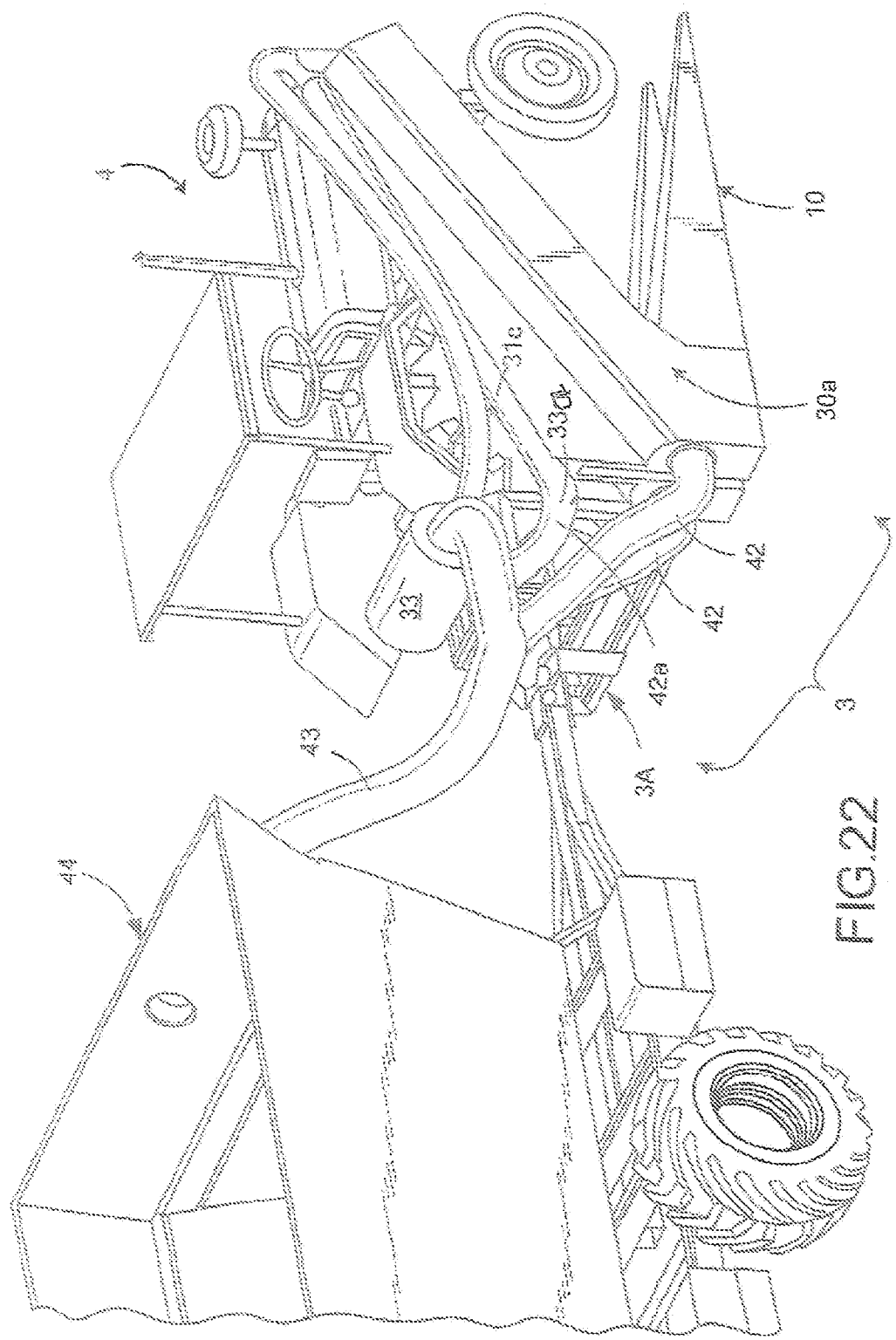
FIG. 22 is a rear perspective view of harvester 30a mounted on a tractor.
Figure 23:
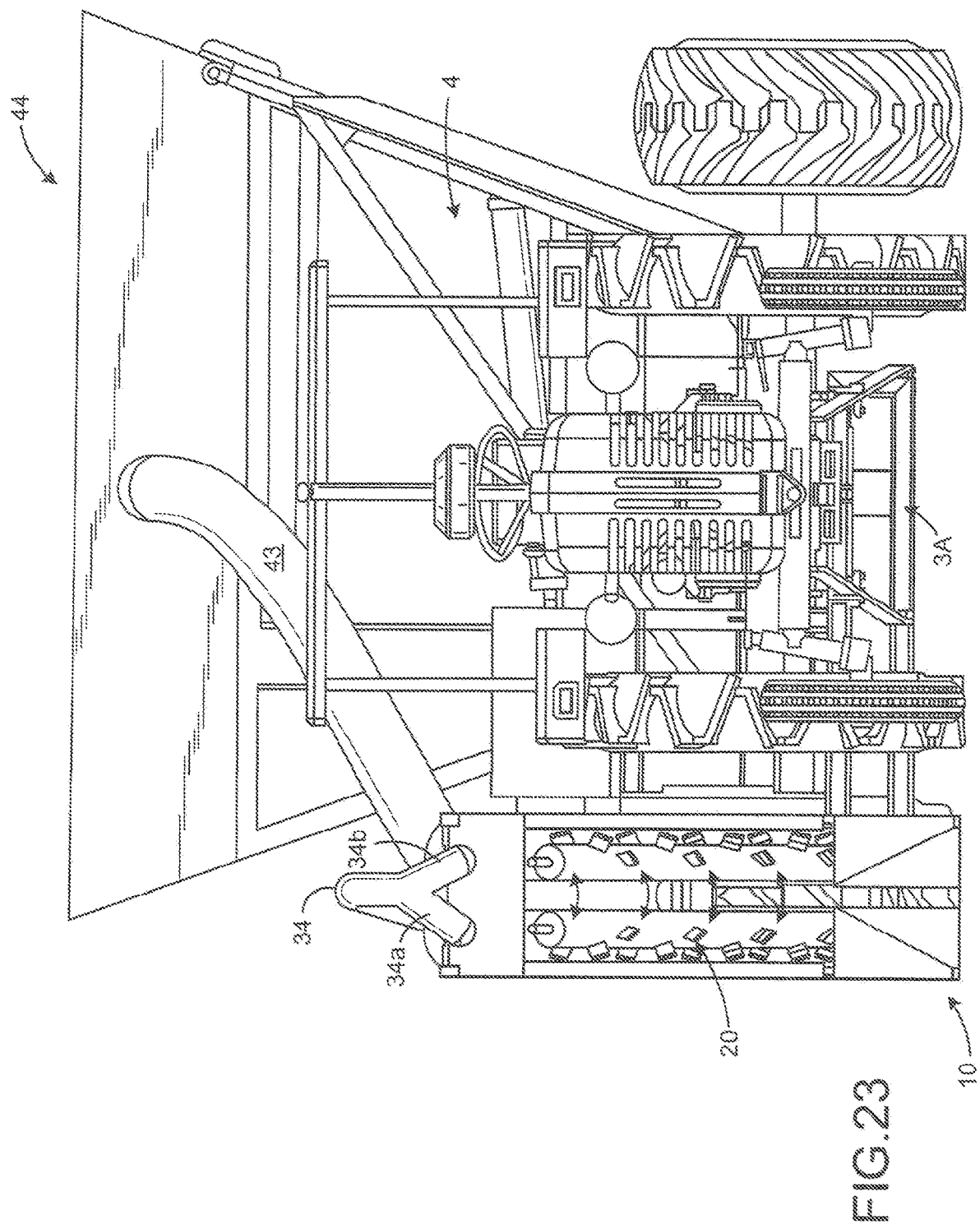
FIG. 23 is a front elevation of harvester 30a mounted on a tractor.

FIGS. 21-23 discloses an alternative embodiment hemp harvester 2 adapted for mounting on a tractor. It comprises: a branch lifter 10 for lifting and bunching the branches of the hemp plants as the harvester is advanced towards them; a stripper 20 with counter rotating stripper rollers 20a having radially extending resiliently flexible paddles 21 which converge as said rolls turn to trap said flowers and leaves between them and strip said flowers and leaves from said stalks and branches; a capture system 30 or 30a for capturing said separated flowers and leaves as they are stripped from the stalk and branches of the plants, leaving said stalks and branches behind; a transfer system 33A for transferring said flowers and leaves from said capture system to a collection chamber.

Lifter 10 is the same as lifter 10 described above. The stripper assembly 20 is as described above. Either capture system 30 or 30a as described above can be used, but as shown in FIG. 21, capture system 30a is used.

An alternative embodiment transfer system 40a is used which relies on a single blower 33. The output of blower 33 is directed in two directions: (1) through a venturi duct 33a and (2) through a blower duct 34 which branches off venturi duct 33a.

Blower duct 34 divides into smaller blower ducts including blower ducts 34a and 34b which service capture chambers 32, blower ducts 34c and 34d which service secondary capture chambers 32a, and blower duct 34e which services inverted shroud channel 31c.

Vacuum ducts 42 come from the rear openings in capture chambers 32 and connecting to venturi duct 33a which created the vacuum through vacuum ducts 42. Vacuum duct 42a comes from the rear opening in inverted channel shroud portion 31c, and also connects to venturi duct 33a, which creates the vacuum in duct 42a. At the point where vacuum ducts 42 and 42a merge with venturi duct 33, the duct becomes a discharge duct blowing hemp flowers and leaves on to a collector 44.

The lifter 10, stripper system 20 and collector 30 are mounted as a unit on frame 3A, which in turn is mounted to tractor 4. Blower 33 is also mounted on frame 3A (FIGS. 22, 23).

Collector bin 44 used with tractor mountable harvester 3 can be sold as part of the harvester system or can simply be a separate wheeled container hitched to tractor 4 in a conventional manner (FIGS. 22, 23). As shown, harvester 3 does not include a mulcher fan 41, but one could be added in discharge duct 43, for mulching the flowers and leaves before being delivered to the collection bin 44. Similarly, and uprooting system 50 as variously described above could be mounted on the bottom of frame 3A for uprooting previously stripped rows of plants, or on the back of capture system 30a for uprooting the plants 2 just stripped.

CONCLUSION

As a result of the present invention, the leaves and flowers of hemp plants are gently and efficiently separated from the stalks and branches, captured and conveyed for mulching and collection. The stalks and branches are uprooted and separated for subsequent processing.

Of course, it is understood that the forgoing discloses preferred embodiments of the invention, and that various changes and alterations can be made without departing from the spirit of the invention.

The invention claimed is:

1. A hemp harvester which strips the leaves and flowers from the stalks and branches of a hemp plant and separates them for subsequent processing comprising: a stripper with counter rotating stripper rollers oriented to embrace the plants being harvested from bottom to top as said counter rotating striper rollers are advanced;

each said counter rotating roller having radially extending resiliently flexible paddles located on said counter rotating roll from the top to bottom thereof, which converge as said rollers turn to trap said flowers and leaves between said flexible paddles and strip said flowers and leaves from said stalks and branches;

said resiliently flexible paddles which extend radially from said counter rotating rolls being made of resiliently flexible pads mounted on rigid reinforcing plates, said pads extending beyond the top and side edges of said reinforcing plates so as to flex when a stem or branch is trapped between converging counter rotating paddles; said pads at the bottom half of each said roll being reinforced with a fingered rigid reinforcing plate to allow extra spacing for the larger stalk at the bottom of each plant, such that the stalks are not severed when trapped between said paddles;

said pads at the top half of each said roll being reinforced with a solid rigid reinforcing plates, to maximize stripping away the valuable top flowers of the plant.

2. The hemp harvester of claim 1 in which said pads at the bottom quarter of each said roll and at the top quarter of each said roll are solid, said pads in the middle section of each said roll being split into multiple fingers extending downwardly from the engaging edge of said pads.

3. The hemp harvester of claim 1 which also comprises: an uprooting system for uprooting the stripped plants from the ground and conveying them for separate processing from said separated flowers and leaves.

4. The hemp harvester of claim 3 in which said uprooting system comprising:
a blade extending diagonally across the path of the approaching striped plants as said harvester proceeds forwardly, whereby stripped plants are uprooted by said blade and are diverted to windrow alongside said harvester.

5. The hemp harvester of claim 3 in which said uprooting system comprises an auger extending diagonally across the path of the approaching striped plants as said harvester proceeds forwardly, whereby stripped plants are uprooted by said blade and are diverted to windrow alongside said harvester.

6. The hemp harvester of claim 3 in which said uprooting system also comprises: a vacuum pick-up conduit and a vacuum pick up/mulcher fan for picking up uprooted stripped plants, mulching them and discharging them through a discharge line extending from said vacuum pick up/mulcher fan to a collector.

7. The hemp harvester of claim 6 which also comprises a drier incorporated into said collector.

* * * * *